(12) United States Patent
Minami et al.

(10) Patent No.: US 6,252,386 B1
(45) Date of Patent: Jun. 26, 2001

(54) NON-CONTACT POWER SUPPLY SYSTEM AND APPARATUS AND CARRYING EQUIPMENT USING THE SYSTEM

(75) Inventors: Hideaki Minami; Haruyoshi Kitayoshi; Satoshi Takashige; Kenzo Yamamoto, all of Osaka; Hisaichi Irie, Kawachinagano, all of (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/452,806

(22) Filed: Dec. 2, 1999

(30) Foreign Application Priority Data

Feb. 12, 1998 (JP) .................................................. 10-343416

(51) Int. Cl.$^7$ ....................................................... H01F 17/00
(52) U.S. Cl. ........................................... 323/355; 323/356
(58) Field of Search .............................. 363/125; 323/355, 323/356, 357, 358, 359; 315/411; 310/110

(56) References Cited

U.S. PATENT DOCUMENTS 3,271,656 * 9/1966 Hines et al. ............................ 321/69

FOREIGN PATENT DOCUMENTS 8308150  11/1996 (JP) .
8308151  11/1996 (JP) .
8308152  11/1996 (JP) .

* cited by examiner

Primary Examiner—Peter S. Wong
Assistant Examiner—Gary L. Laxton
(74) Attorney, Agent, or Firm—Birch, Stewart, Kolasch & Birch, LLP

(57) ABSTRACT

In a non-contact power supply apparatus which interlinks a magnetic flux generated by an AC current flowing through a primary circuit with a secondary circuit so that an induced power is generated in the secondary circuit, and supplies a constant voltage to a load, the secondary circuit is composed of a plurality of inductors connected in series, and each of a plurality of capacitors is interposed between inductors. The total sum of inductance of the plurality of inductors and the total sum of capacitance of the plurality of capacitors have a resonant relation with respect to an AC current of the primary circuit.

2 Claims, 9 Drawing Sheets

NON-CONTACT POWER SUPPLY SYSTEM AND APPARATUS AND CARRYING EQUIPMENT USING THE SYSTEM

BACKGROUND OF THE INVENTION

The present invention relates to a non-contact power supply system and apparatus for supplying electric power to a load from a feeder line connected to an AC power source via a pickup portion magneto-coupled in a physically non-contact state with the feeder line, and to carrying equipment using the non-contact power supply system and apparatus.

In general, a monorail type carrying equipment has been widely employed in an assembly process of an automobile or the like. In such carrying equipment, a plurality of carrier vehicles, on which an assembly part to be carried is placed, are put on a common rail, and feeding is carried out with respect to a drive motor and a control system mounted on each carrier vehicle so that each carrier vehicle is independently driven and controlled, and thus, each carrier vehicle is automatically driven while being stopped at each predetermined station.

As one of power supply methods with respect to each carrier vehicle, a non-contact power supply apparatus is employed. More specifically, in the non-contact power supply apparatus, a feeder line connected to an AC power source is arranged along a common rail, and a carrier vehicle side is provided with a pickup portion magneto-coupled in a physically non-contact state with the feeder line, and thus, power supply is carried out with respect to each carrier vehicle from the feeder line via the pickup portion.

Non-contact power supply apparatus in the prior art, as shown in FIG. 1 and FIG. 2 has been known. FIG. 1 is a schematic view showing a construction of a parallel resonance non-contact power supply apparatus, and FIG. 2 is a schematic view showing a construction of a general serial resonance non-contact power supply apparatus.

In FIG. 1, a reference numeral 5 denotes a magnetocoupling portion, and 6 denotes an incoming circuit. The magnetocoupling portion 5 comprises a feeder line 2 connected to a high-frequency AC power source and a pickup portion 10, and the feeder line 2 and the pickup portion 10 are magneto-coupled in a physically non-contact state. The pickup portion 10 comprises a pickup core 11 made of a magnetic body and a pickup coil 12 wound around the core 11. The incoming circuit 6 is composed of a resonance capacitor 21 which is connected in parallel with both ends of the pickup coil 12 of the pickup portion 10, a constant-current/constant-voltage converting part 22 and a rectifying part 23. A load such as a drive motor (not shown) of a carrier vehicle is connected to the rectifying part 23 of the incoming circuit 6.

In the aforesaid parallel resonance non-contact power supply apparatus, when a constant current of about 10 to 20 kHz flows to the feeder line 2 from the AC power source, a magnetic flux generated around the feeder line 2 is inter-linked with the pickup coil 12 of the pickup portion 10 in the magneto-coupled portion 5, and thus, an induced power is generated in the pickup coil 12. An inductance of the pickup coil 12 and a capacitance of the resonance capacitor 21 are set so as to have a resonance relation, and thereby, these pickup coil 12 and the resonance capacitor 21 function as a constant current source. Then, the generated induced power is converted into a constant voltage as a predetermined constant current by means of the constant-current/constant-voltage converting part 22, of the incoming circuit 6 and further, is rectified by means of the rectifying part 23, and thus, is supplied to a load.

On the other hand, in the serial circuit as shown in FIG. 2, the resonance capacitor 21 is connected in series to the pickup coil 12, and the incoming circuit 6 is composed of a rectifying part 23 which is provided with a load In the aforesaid serial resonance non-contact power supply apparatus, when a constant current of about 10 to 20 kHz flows to the feeder line 2 from the AC power source, a magnetic flux generated around the feeder line 2 is inter-linked with the pickup coil 12 of the pickup portion 10 in the magnetocoupling portion 5, and thus, an induced power is generated in the pickup coil 12. An inductance of the pickup coil 12 and a capacitance of the resonance capacitor 21 are set so as to have a resonance relation, and thereby, these pickup coil 12 and the resonance capacitor 21 function as a constant voltage source. Then, the generated induced power is rectified as a predetermined constant voltage by means of the rectifying part 23 of the incoming circuit 6, and then, is supplied to a load.

In the aforesaid parallel resonance non-contact power supply apparatus, even in the case where no load is operated, a large circulating current flows through a resonance circuit comprising the pickup coil 12 and the resonance capacitor 21, and then, the pickup coil 12, which is a secondary winding, is exothermic. For this reason, a supply of current must be carried out with respect to a load within a coating heat-proof limit range of the pickup coil 12; as a result, there is a problem that a supply capability is limited. Further, there is a problem that the constant-current/constant-voltage converting part 22 is indispensable to the incoming circuit 6.

On the other hand, in the serial resonance non-contact power supply apparatus, a constant voltage source is composed of a resonance circuit comprising the pickup portion 10 and the resonance capacitor 21; therefore, no converter circuit for constant-current and constant-voltage is required. A current flowing through the pickup coil 12 is small as a load current; however, there is an air gap between distal ends of the pickup core 11 of the magnetocoupling portion 5; for this reason, a mutual inductance between the feeder line 2 and the pickup portion 10 is small. In order to supply a required voltage to a load, the number of windings of the pickup coil 12 must be increased. As a result, an inductance of the pickup coil 12 becomes large, and in the case where a current flows through the load, a potential difference between both terminals of the pickup coil 12 becomes several thousands of voltages. Thus, a discharge is generated between adjacent windings; as a result, there is the possibility that a dielectric breakdown is caused. Further, like the case of the aforesaid parallel resonance non-contact power supply apparatus, there is a problem in that a supply capability must be limited.

BRIEF SUMMARY OF THE INVENTION

An object of the present invention is to provide a non-contact power supply system and apparatus which can prevent a high voltage from being generated in a secondary circuit, and can supply a large current to a load without a limitation of supply capability.

Another object of the present invention is to provide a non-contact power supply system and apparatus which is constructed in a manner that a current does not flow through an inductor such as a coil even in the case where a load current is zero, and can reduce a current loss.

Further, still another object of the present invention is to provide a carrying equipment which can effectively drive a carrier vehicle at a high speed.

A first aspect of the present invention provides a non-contact power supply apparatus which interlinks a magnetic flux generated by an AC current flowing through a primary circuit with a secondary circuit so that an induced power is generated in the secondary circuit, and supplies a constant voltage to a load, wherein the secondary circuit includes: a plurality of inductors connected in series; and a plurality of capacitors each of which is interposed between the plurality of inductors.

According to the first aspect of the present invention, the inductor and the capacitor are alternately connected in series, and thereby, not only the incoming circuit requires no constant-current/constant-voltage converting part, but also no circulating current flows as compared with the parallel resonance non-contact type. As a result, even if a load current flows, no large current flows through the inductor, and an exothermic value is low in the secondary circuit; therefore, it is possible to provide a small-size non-contact power supply apparatus, and to achieve a cost reduction.

Further, a second aspect of the present invention provides a non-contact power supply apparatus wherein the total sum of inductance of the plurality of inductors and the total sum of capacitance of the plurality of capacitors have a substantially resonant relation with respect to a frequency of the AC current. According to the second aspect of the present invention, the total sum of inductance and the total sum of capacitance have a substantially resonant relation with respect to a predetermined frequency of the AC current; therefore, a potential difference generated in each combination of an inductor and a capacitor is offset, and a dielectric breakdown is hard to occur. As a result, it is possible to make large a load current; therefore, a supply capability can be made large.

Further, a third aspect of the present invention provides a non-contact power supply apparatus wherein one capacitor of the plurality of capacitors and one inductor adjacent to the capacitor have a substantially resonant relation with respect to a frequency of the AC current. According to the third aspect of the present invention, the inductor and the capacitor are set so as to have a serial resonant relation. Therefore, in the case where a load current is zero, no current flows through the secondary circuit; as a result, a current loss can be reduced.

Further, in the first, second or third aspect of the present invention, a fourth aspect of the present invention provides a non-contact power supply apparatus wherein the plurality of inductors are a plurality of coils which are separate from each other and wound around a single magnetic body. According to the fourth aspect of the present invention, it is possible to prevent a dielectric breakdown, a temperature rise of the secondary circuit, and to simplify a voltage resisting structure and a heat resisting structure, and thus to achieve a cost reduction.

The above and further objects and features of the invention will more fully be apparent from the following detailed description with accompanying drawings.

DETAILED DESCRIPTION OF THE INVENTION

The present invention will be described in detail below with reference to the accompanying drawings showing embodiments in the case where the present invention is applied to non-contact feeding with respect to a load such as a motor of a carrier vehicle.

(Embodiment 1)

Figure 1:
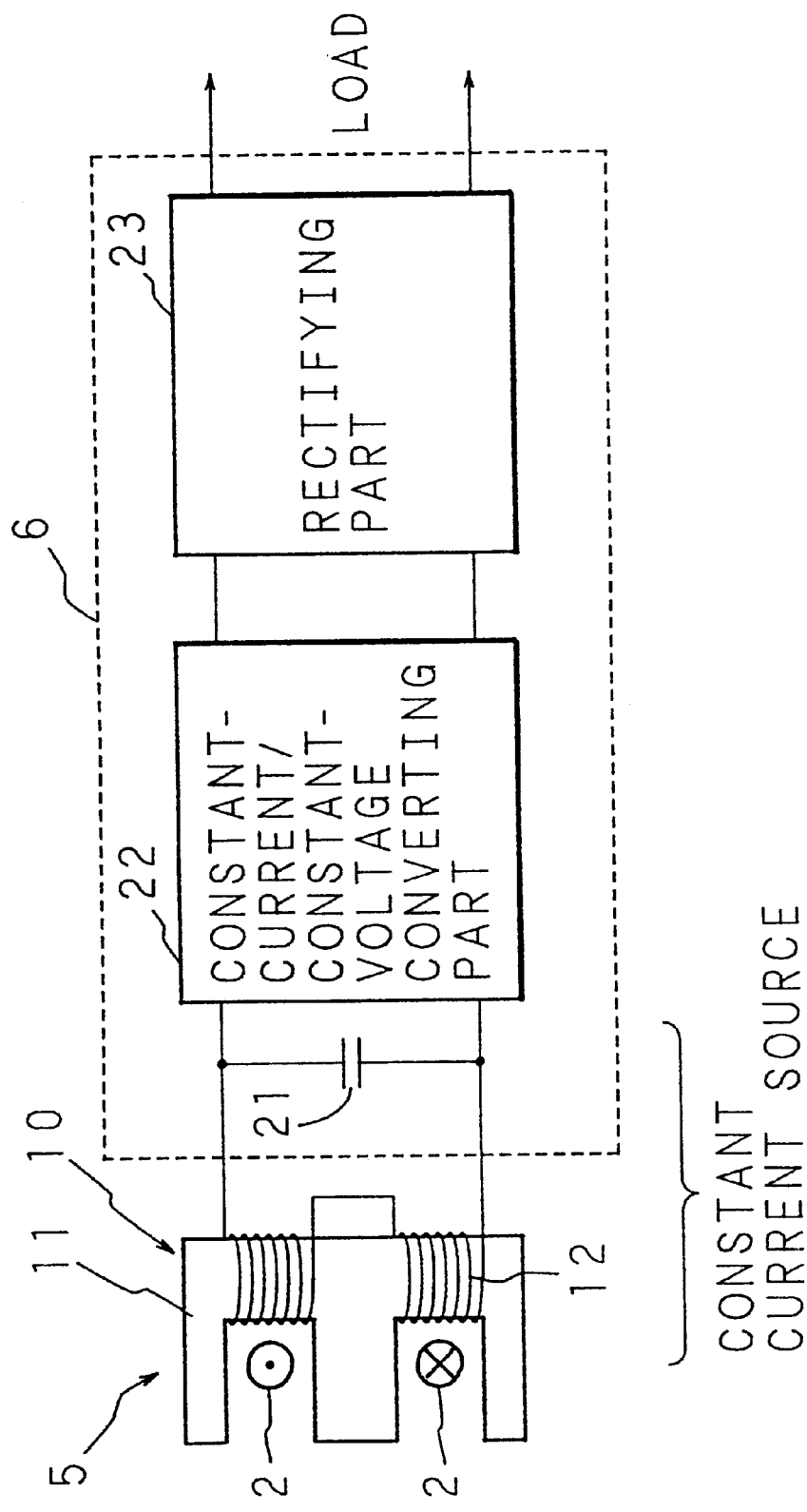
FIG. 1 is a schematic view showing a magnetic non-contact power supply apparatus in the prior art.
Figure 2:
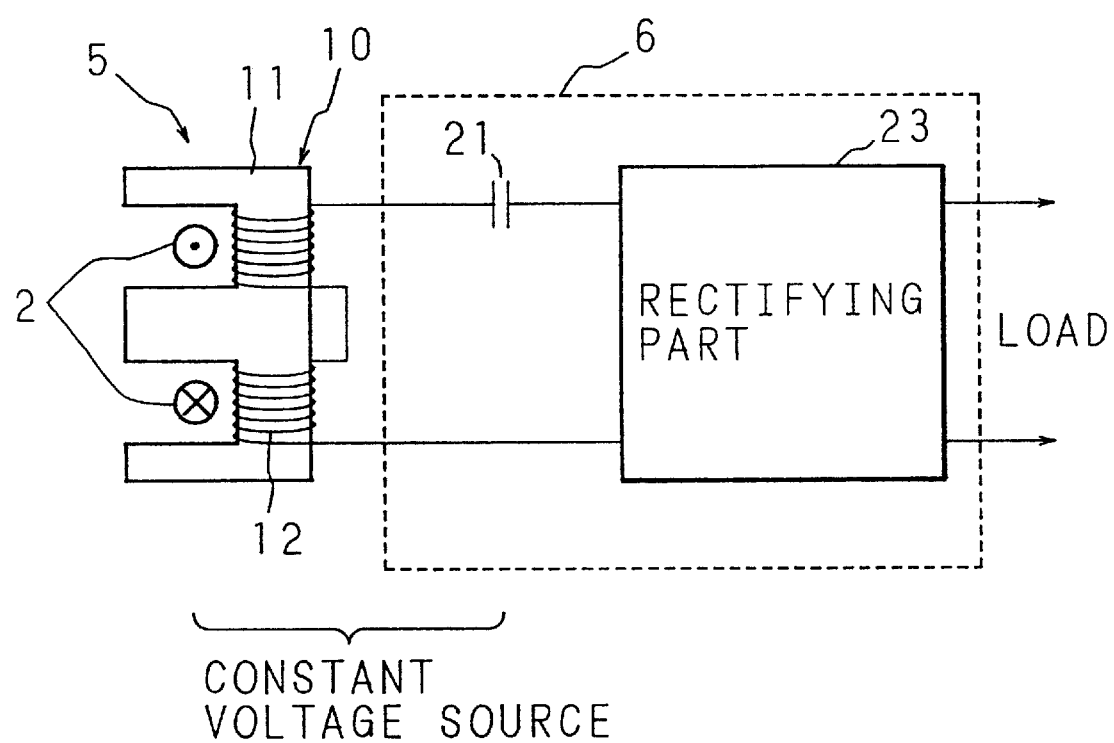
FIG. 2 is a schematic view showing a magnetic non-contact power supply apparatus in the prior art.
Figure 3:
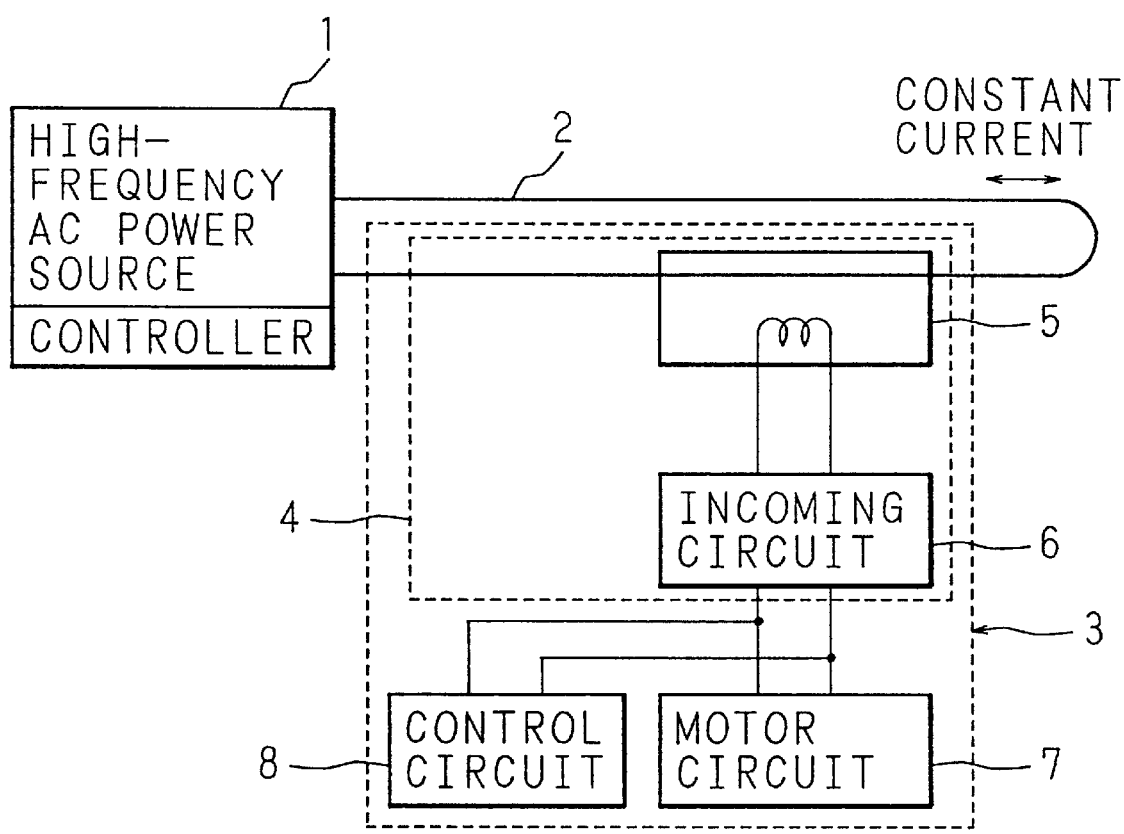
FIG. 3 is a block diagram showing a construction of a monorail type carrying equipment to which a non-contact power supply system according to the present invention is applied.

FIG. 3 is a block diagram showing a construction of a monorail type carrying equipment to which a non-contact power supply system according to the present invention is applied. In FIG. 3, a reference umeral 1 denotes a high-frequency AC power source of 10 to 20 kHz, 2 denotes a feeder line, and 3 denotes a carrier vehicle.

The AC power source 1 is connected with the feeder line 2. A constant current having a predetermined value flows through the feeder line 2 from the AC power source 1 by means of a controller. The feeder line 2 is laid along a guide rail of the carrier vehicle 3. The carrier vehicle 3 is put on the guide rail, and then, receives a supply of electric power from the feeder line 2 via a non-contact power supply apparatus 4 according to the present invention, and thus, can automatically travel along the guide rail by operating a motor and a control system. The non-contact power supply apparatus 4 includes a magnetocoupling portion 5 and an incoming circuit 6, and carries out power supply from the incoming circuit 6 with respect to a motor circuit 7 including a drive motor and a control circuit 8 which are built in the carrier vehicle 3. Incidentally, a detailed construction of the monorail type carrying equipment will be described later.

Figure 4:
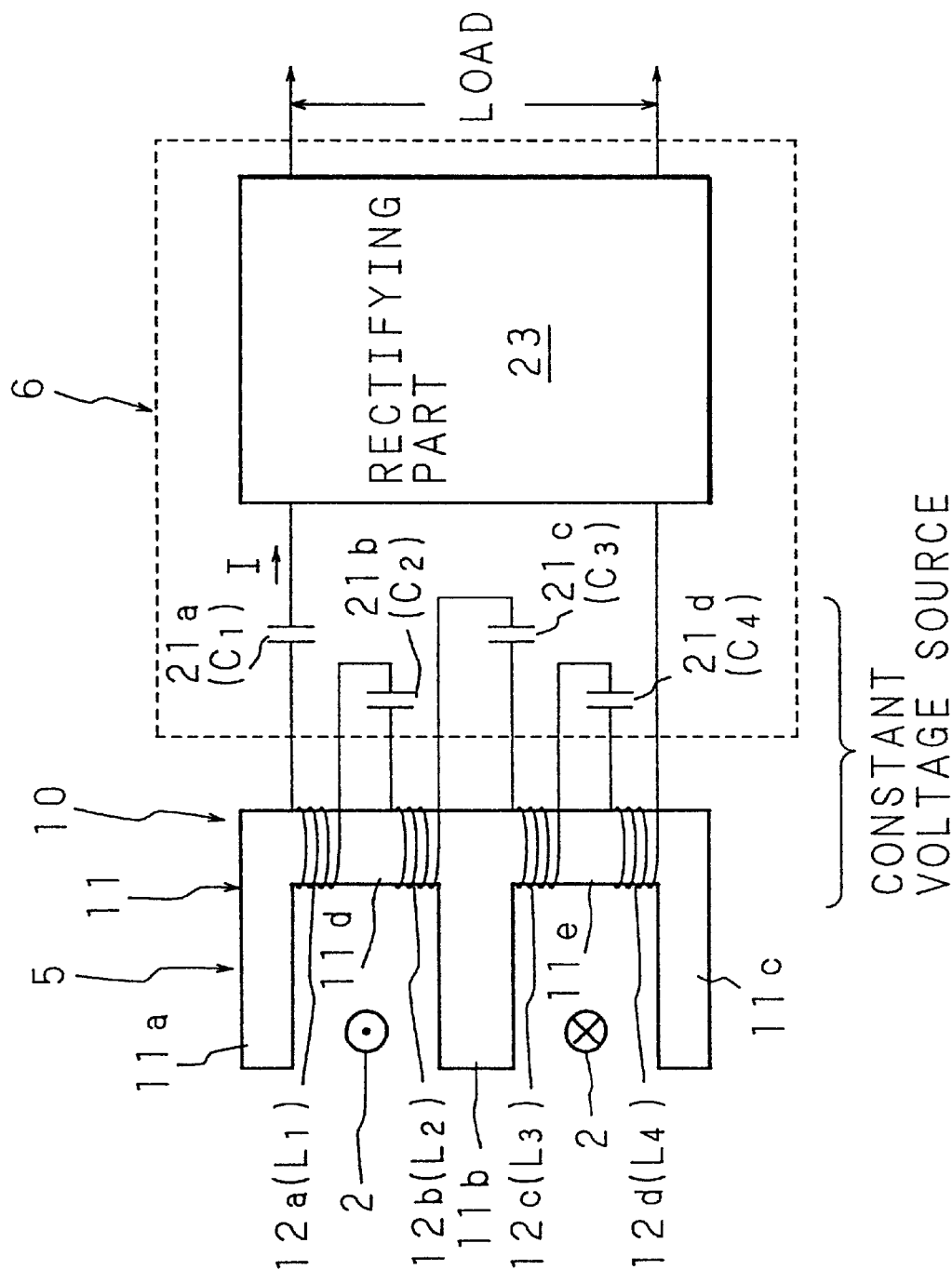
FIG. 4 is a schematic view showing a construction of the non-contact power supply apparatus according to the present invention.

FIG. 4 is a schematic view detailedly showing a construction of the non-contact power supply apparatus 4. The magnetocoupling portion 5 comprises the feeder line 2 and a pickup portion 10 which is magnetocoupled in a physically non-contact state with the feeder line 2. The pickup portion 10 is constructed in the following manner. More specifically, as shown in FIG. 4, the pickup portion 10 comprises a pickup core 11 which is made of a magnetic material and is formed into a shape of E-letter in viewing from the side. The pickup core 11 is composed of plate-like portions 11a, 11b and 11c which are projected respectively from upper, intermediate and lower stage of the core, and back plate portions 11d and 11e connecting these plate-like portions. Further, pickup coils 12a to 12d (inductance $L_1$ to $L_4$), which are separated to four inductors, are wound around the back plate portions 11d and 11e. The feeder line 2 is positioned in a U-letter region surrounded by the plate-like portions 11a and 11b and the back plate portion 11d, and in a U-letter region surrounded by the plate-like portions 11b and 11c and the back plate portion 11e in a physically non-contact state with these components.

On the other hand, the incoming circuit 6 includes a plurality of capacitors 21a to 21d (capacitance $C_1$ to $C_4$) and a rectifying part 23. The capacitor 21a is interposed between the pickup coil 12a and the rectifying part 23, the capacitor 21b is interposed between the pickup coils 12a and 12b, the capacitor 21c is interposed between the pickup coils 12b and 12c, and the capacitor 21d is interposed between the pickup coils 12c and 12d. These pickup coils 12a to 12d and capacitors 21a to 21d are connected in series as a whole, and thereby, a constant voltage source is constructed.

Each inductance $L_1$ to $L_4$ of the pickup coils 12a to 12d and each capacitance $C_1$ to $C_4$ of the capacitors 21a to 21d are set so that the total sum $(L_1+L_2+L_3+L_4)$ of inductance and the total sum $(C_1+C_2+C_3+C_4)$ of capacitance become a resonant relation with respect to a specific frequency (e.g., usually 16 kHz) of the AC power source 1.

Likewise, the inductance and capacitance are set so as to become the following relation with respect to the specific frequency of the AC power source 1; more specifically, the inductance $L_1$ and the capacitance $C_1$ become a resonant relation;

the inductance $L_2$ and the capacitance $C_2$ become a resonant relation;

the inductance $L_3$ and the capacitance $C_3$ become a resonant relation; and the inductance $L_4$ and the capacitance $C_4$ become a resonant relation.

Thus, a constant voltage source is constructed as the total reactance of capacity reactance and induced reactance being zero.

In the aforesaid embodiment 1, the inductance $L_1$ to $L_4$ and the capacitance $C_1$ to $C_4$ are set to a serial resonant state; therefore, in the secondary circuit, a potential difference is offset in each combination of the inductance and the capacitance which have the aforesaid resonant relation. For this reason, no large potential difference is generated between pickup coils 12 to 12d, and it is possible to prevent a dielectric breakdown; as a result, a load current can be made large.

Moreover, even if a load current I flows and a potential difference between both terminals of the pickup coil 12a becomes $\omega L_1$ I, a potential difference between both terminals of the capacitor 21a becomes an opposite phase $I/\omega C_1$, and then, the pickup coil 12a and the capacitor 21a have a resonant relation ($\omega L_1 = 1/\omega C_1$); therefore, the a potential difference between both terminals of the pickup coil 12a and the capacitor 21a becomes a relation of $\omega L_1$ I–I/$\omega C_1$=I ($\omega L_1 - 1/\omega C_1$)=0.

The same relation as described above is established between the pickup coil 12b (inductance $L_2$; and the capacitor 21b (capacitance $C_2$), between the pickup coil 12c (inductance $L_3$) and the capacitor 21c (capacitance $C_3$), and between the pickup coil 12d (inductance $L_4$) and the capacitor 21d (capacitance $C_4$). Namely, a relation is established such that the potential difference between both terminals becomes "0".

The above embodiment 1 has described the case where the separative number of the pickup coil 12 is four. The separative number is not limited to the above embodiment, and in general, the pickup coil 12 may be separated so that $\omega L_N$ I (N: integer) becomes a circuit allowable voltage (usually, 600V) or less.

(Embodiment 2)

Figures 5A, 5B:
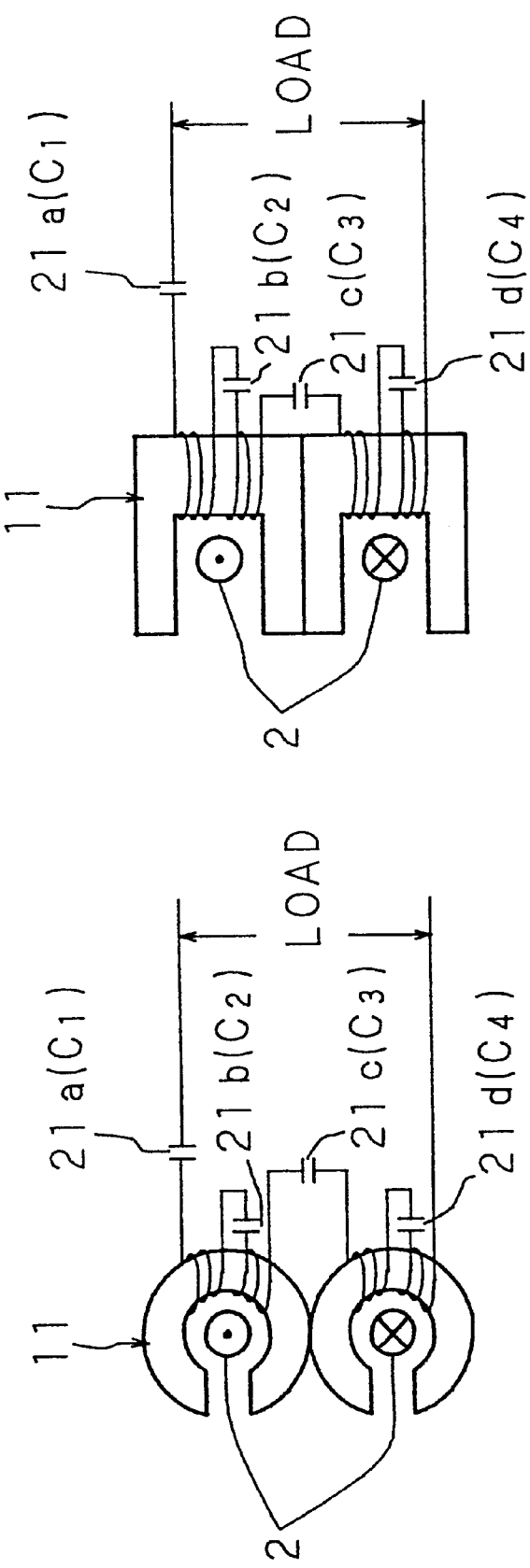
FIG. 5A and FIG. 5B are schematic views showing other constructions of a magnetocoupling portion.

FIG. 5A and FIG. 5B are schematic views showing other constructions of the pickup portion 10. In FIG. 5A, two magnetic bodies having a shape of C-letter in viewing from the side are piled up in a state that their opening sides are oriented to the same direction, and thus, a pickup core 11 is integrally assembled. In FIG. 5B, two magnetic bodies having a shape of U-letter in viewing from the side are piled up in a state that their opening sides are oriented to the same direction, and thus, a pickup core 11 is assembled.

Other constructions are the substantially same as the constructions described in the embodiment 1, and the same reference numerals are used to designate the corresponding parts, and therefore, the details are omitted.

Figure 6:
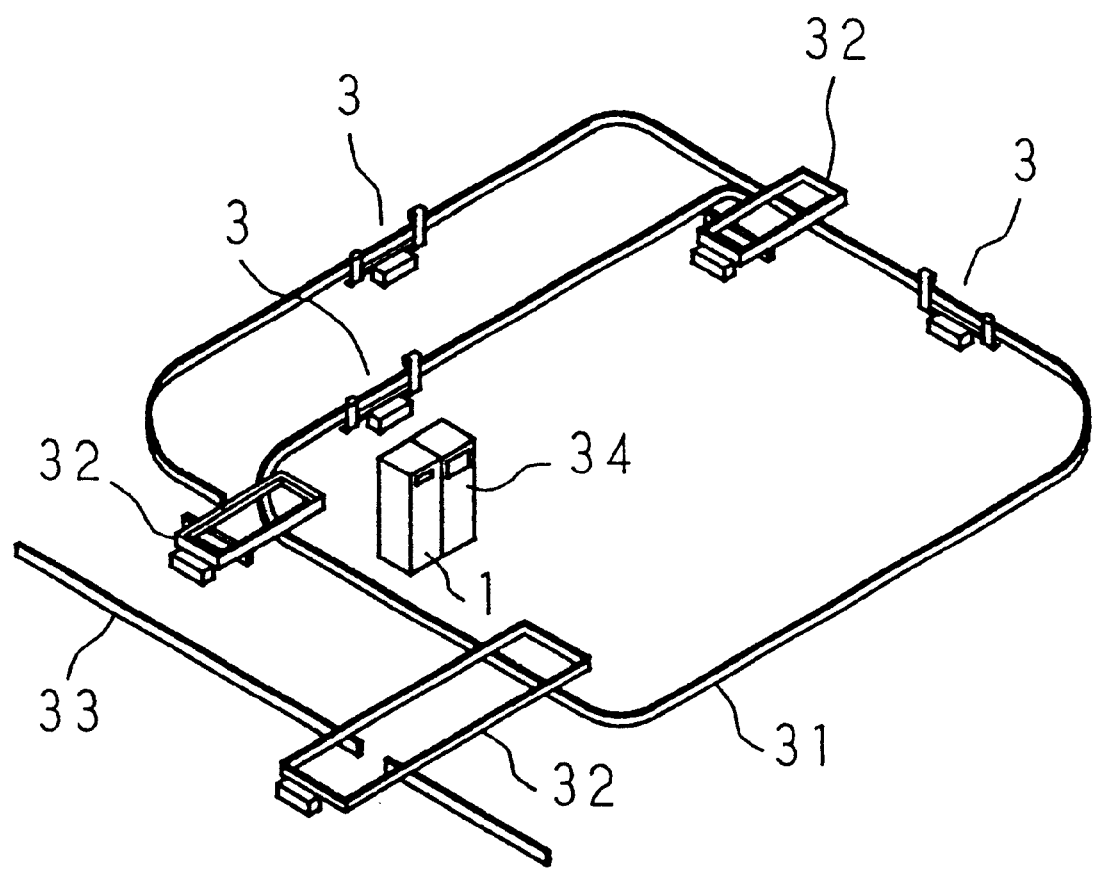
FIG. 6 is a view showing the whole of monorail type carrying equipment to which a non-contact power supply system according to the present invention is applied.
Figure 7:
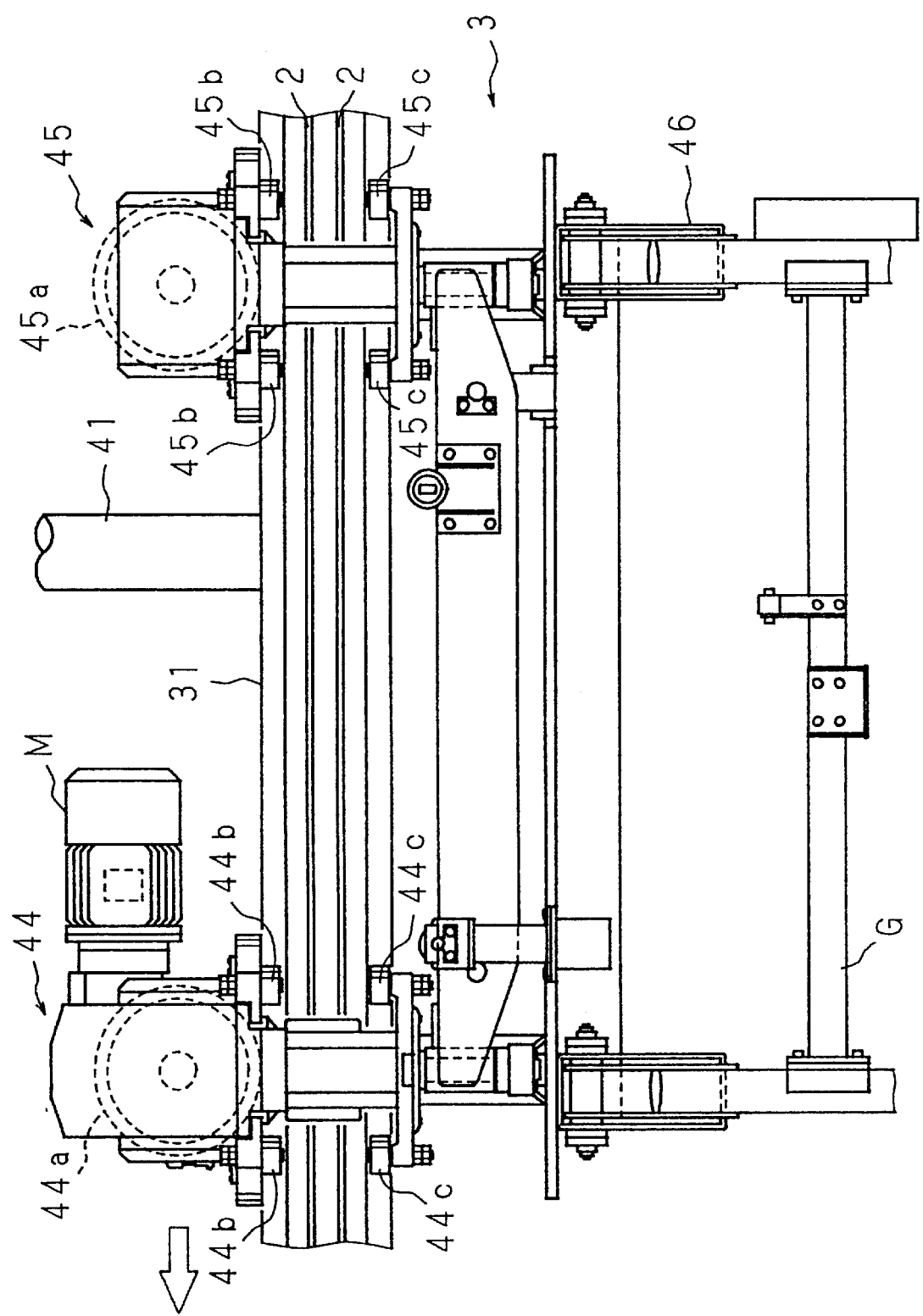
FIG. 7 is an enlarged side view showing a relationship between a guide rail and a carrier vehicle in the carrying equipment shown in FIG. 6.
Figure 8:
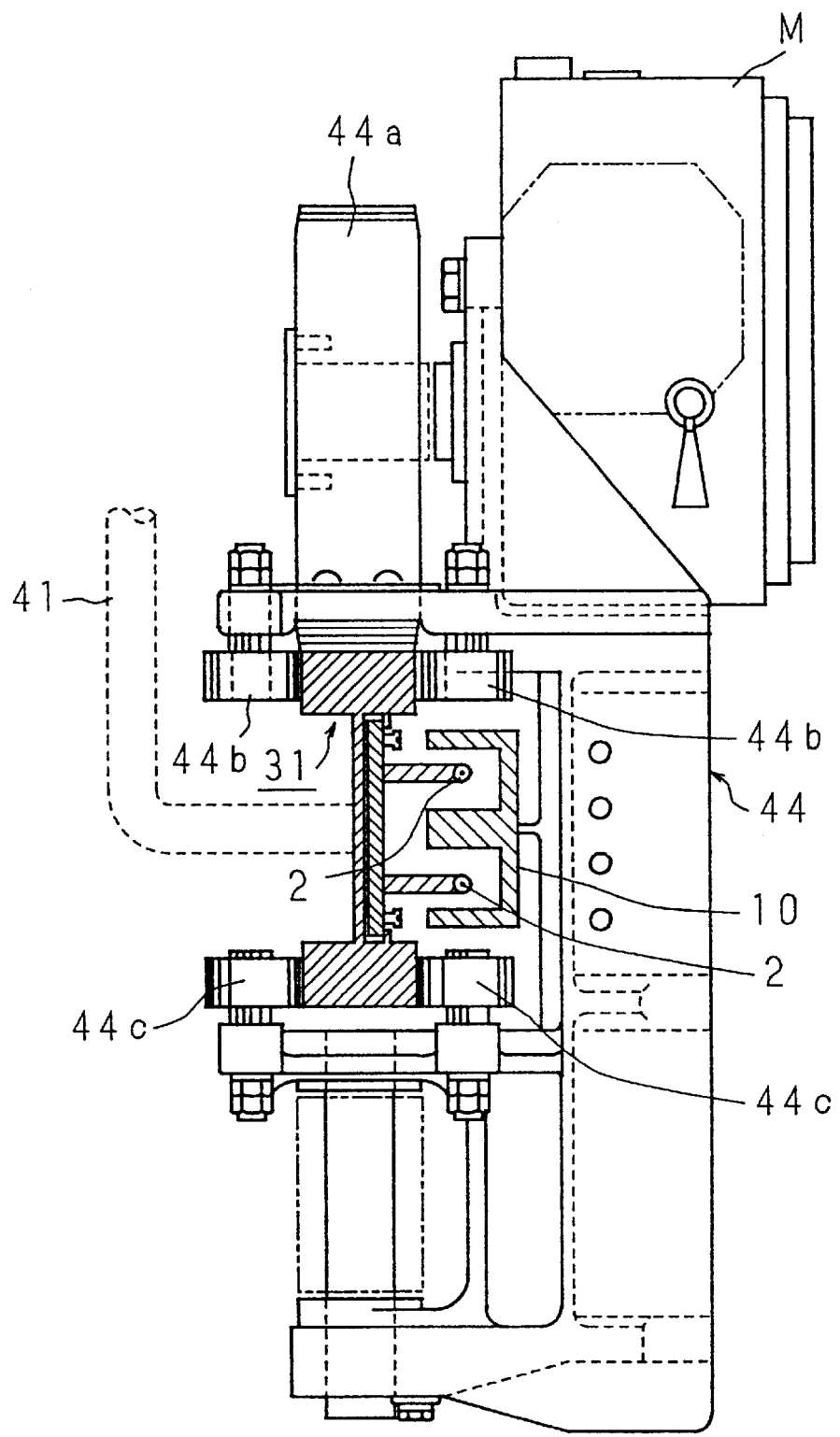
FIG. 8 is an enlarged front view showing a relationship between a guide rail and a carrier vehicle in the carrying equipment shown in FIG. 6.
Figure 9:
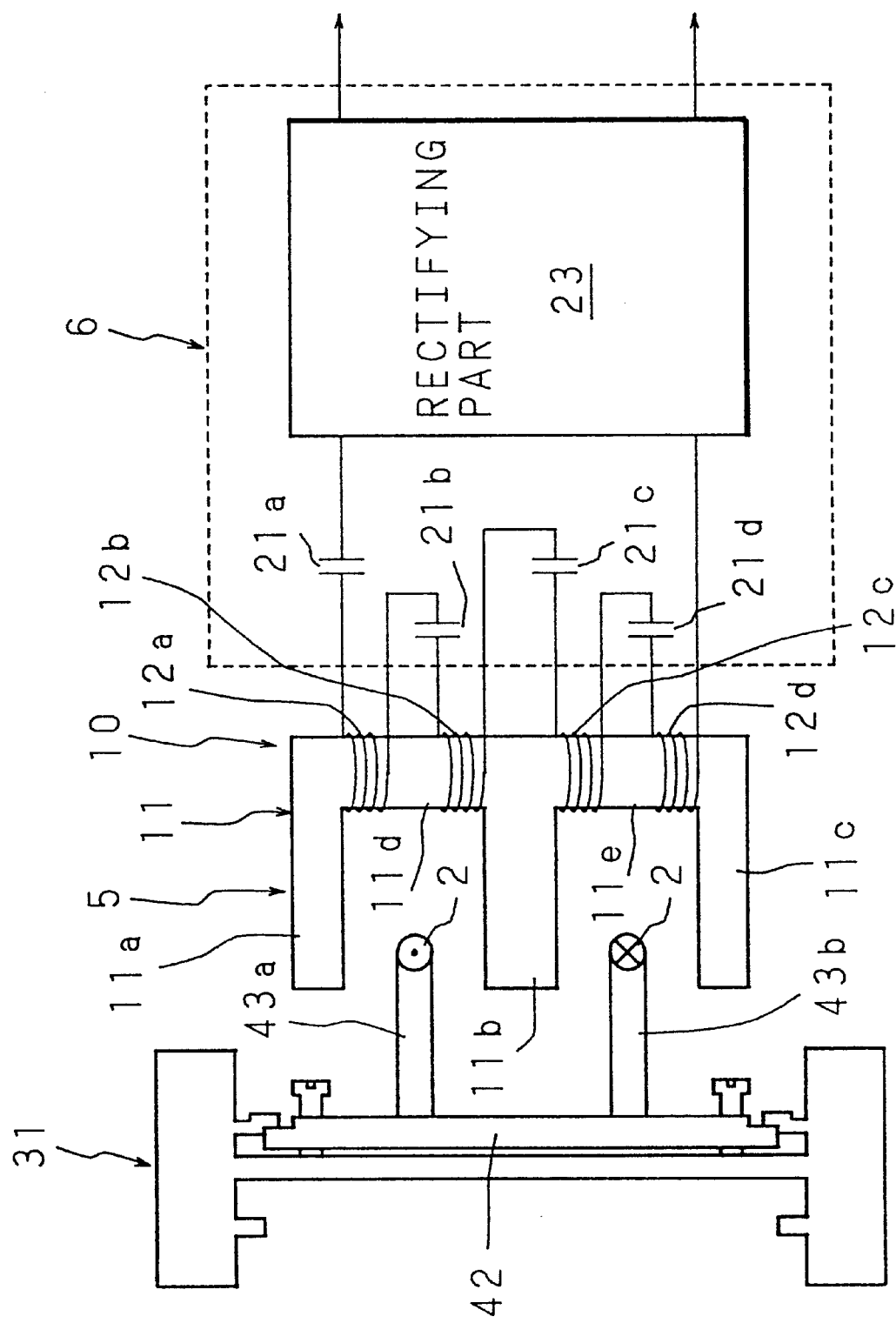
FIG. 9 is a schematic view showing a relationship between a feeder line of the guide rail and a pickup portion of the carrier vehicle in the carrying equipment shown in FIG. 6.

Next, the following is a description on a detailed construction of a monorail type carrying equipment to which the non-contact power supply apparatus 4 having the aforesaid construction is applied. FIG. 6 is a view showing the whole of the carrying equipment, FIG. 7 and FIG. 8 are perspective and front views showing a relationship between a guide rail 31 and a carrier vehicle 3 in the carrying equipment, and FIG. 9 is an enlarged sectional view showing an induction coupling structure of the feeder line 2 and the pickup portion 10.

In a factory, the guide rail 31 having a shape of I-letter in its cross section is suspended. A supporting arm 41 is attached to one side of the guide rail 31 at substantially regular intervals in a longitudinal direction, and the guide rail 31 is located in a state of being suspended from a ceiling, etc. of the factory via the supporting arm 41. The guide rail 31 is laid so as to form a shape of multiple loop connecting each station in order to carry assembly parts, and each intersecting portion is provided with a switch rail type diverge/merge portion 32 in order to selectively utilize the one. Moreover, a repair line 33 is suspended in the factory like the guide rail 31. The carrier vehicle 3 requiring maintenance and inspection is guided to the repair line 33 from the guide rail 31 via the diverge/merge portion 32, and then, repair of the carrier vehicle 3 is carried out in the repair line 33.

The aforesaid high-frequency AC power source 1 and a system controller 34 are located on the ground in the factory. As described before, a high-frequency current is fed from the AC power source 1 to the feeder line 2, and then, power supply is carried out with respect to each carrier vehicle 3 by means of the non-contact power supply apparatus 4.

The system controller 34 carries out a control required for carrying assembly parts G from one station to another target station with the use of the carrier vehicle 3. More specifically, the system controller 34 instructs the carrier vehicle 3 to carry out a work such as loading and unloading, and besides, outputs a control signal for securing a traveling route. Further, the system controller 34 instructs a station controller provided in each station to carry out a work for moving and loading the assembly parts G. Furthermore, the system controller 34 controls an operation of the whole system, secures a safety, and besides, gives an alarm when a failure takes place.

As shown in FIG. 7 and FIG. 8, the carrier vehicle 3 is constructed in a manner that a carrier 46 for detachably mounting the assembly parts G is suspended from a pair of longitudinal body frames 44 and 45 holding the guide rail 31 in viewing from the front. The body frame 44 is provided with a drive trolly 44a which rolls in contact with the guide rail 31, at an upper portion thereof and at a position facing the upper surface of the guide rail 31. Further, the body frame 44 is provided with two pairs of clamper rollers 44b and 44c which roll in contact with the guide rail 31, at an upper and lower portion thereof and at a position facing each of upper and lower side surfaces of the guide rail 31. Likewise, the body frame 45 is provided with a drive trolly 45a which rolls in contact with the guide rail 31, at an upper portion thereof and at a position facing the upper surface of the guide rail 31. Further, the body frame 45 is provided with clamper rollers 45b and 45c which roll in contact with the guide rail 31, at an upper and lower portion thereof and at a position facing each of upper and lower side surfaces of the guide rail 31.

Moreover, a motor M connected to the drive trolly 44a is fixed to the upper portion of the body frame 44. In addition, the body frame 44 is provided with the pickup portion 10 on a side facing the feeder line 2 of the guide rail 31. In a state that drive trollys 44a and 45a roll in contact with the upper end surface of the guide rail 31; on the other hand, the clamper rollers 44b, 44c, 45b and 45c roll in contact with both side surfaces of lower end of the guide rail 31, and in a state that the pickup portion 10 faces the feeder line 2, the body frames 44 and 45 are put on the guide rail 31.

The other side surface of the guide rail 31 is fixedly provided with the feeder line 2 whose both terminals are connected to the AC power source 1, over the entire length of the guide rail 31 in the longitudinal direction. The feeder line 2 is constructed in the following manner; more specifically, an electric wire is stretched across each distal end portion of a pair of supporters 43a and 43b which are projected from one side of an attachment plate 42 screwed onto the other side surface of the guide rail 31 to a vertical direction at a predetermined interval, and further, is formed like a loop.

As is evident from the above description, in the present invention, the inductors and the capacitors are combined so as to construct a serial resonance non-contact power supply apparatus, and thereby, the incoming circuit requires no constant-current/constant-voltage converting part, and no circulating current flows even in a state that a load is zero as compared with the parallel resonance power supply apparatus. Further, the inductors and the capacitors are alternately connected in series, and thereby, it is possible to make small a potential difference, and a dielectric breakdown is hard to caused. As a result, even if a load current flows, no large current flows through the secondary circuit, and an exothermic value is low in the secondary circuit; therefore, it is possible to provide a small-size non-contact power supply apparatus, and to achieve a cost reduction.

Further, the total sum of inductance and the total sum of capacitance have a substantially resonant relation with respect to a predetermined frequency of the AC power source; therefore, a potential difference generated in an inductor of the secondary circuit is offset, and a dielectric breakdown is hard to be caused. As a result, it is possible to make a load current large; therefore, a supply capability can be made large.

Further, in the case where a load current is zero, no current flows through the secondary circuit; therefore, a current loss is reduced, and a potential difference is offset in each combination of the inductors and the capacitors which have a resonant relation. As a result, no large current flows, and an exothermic value is low in the secondary circuit; therefore, a supply capability can be made large.

Furthermore, it is possible to prevent a temperature rise of the secondary circuit, and to simplify a voltage resisting structure and a heat resisting structure, and thus to achieve a cost reduction.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A non-contact power supply apparatus which interlinks a magnetic flux generated by an AC current flowing through a primary circuit with a secondary circuit so that an induced power is generated in the secondary circuit, and supplies a constant voltage to a load;

wherein the secondary circuit includes:

a plurality of inductors connected in series; and a plurality of capacitors each of which is interposed between said plurality of inductors;

wherein one capacitor of said plurality of capacitors and one inductor adjacent to said one capacitor have a substantially resonant relation with respect to a frequency of the AC current.

2. A non-contact power supply apparatus which interlinks a magnetic flux generated by an AC current flowing through a primary circuit with a secondary circuit so that an induced power is generated in the secondary circuit, and supplies a constant voltage to a load;

wherein the secondary circuit includes:

a plurality of inductors connected in series; and a plurality of capacitors each of which is interposed between said plurality of inductors;

wherein said plurality of inductors are a plurality of coils which are separate from each other and wound around a single magnetic body.

\* \* \* \* \*